(12) United States Patent
Anderson (10) Patent No.: US 8,820,817 B1
(45) Date of Patent: Sep. 2, 2014

(54) TRACTOR TRAILER REAR DOOR AIR DRAG REDUCTION SYSTEM TO REDUCE FUEL CONSUMPTION

(71) Applicant: Matthew Anderson, Lower Hutt (NZ)

(72) Inventor: Matthew Anderson, Lower Hutt (NZ)

( * ) Notice: Subject to any disclaimer, the term of this patent is extended or adjusted under 35 U.S.C. 154(b) by 0 days.

(21) Appl. No.: 13/871,173

(22) Filed: Apr. 26, 2013

(51) Int. Cl.
*B62D 35/00* (2006.01)

(52) U.S. Cl.
CPC .................................. *B62D 35/004* (2013.01)
USPC .................. 296/180.1; 296/180.4; 296/180.5

(58) Field of Classification Search
CPC .............................. B62D 35/00; B62D 35/004
USPC .................................. 296/180.1, 180.4, 180.5
See application file for complete search history.

(56) References Cited

U.S. PATENT DOCUMENTS

| | | | |
|---|---|---|---|
| 4,142,755 A | 3/1979 | Keedy | |
| 6,309,010 B1 * | 10/2001 | Whitten | 296/180.4 |
| 6,666,498 B1 * | 12/2003 | Whitten | 296/180.4 |
| 7,699,382 B2 * | 4/2010 | Roush et al. | 296/186.3 |
| 7,866,734 B2 | 1/2011 | Mracek | |
| 8,287,030 B2 | 10/2012 | Ryan et al. | |

* cited by examiner

*Primary Examiner* — Dennis H Pedder
*Assistant Examiner* — Beverly Becker
(74) *Attorney, Agent, or Firm* — Malin Haley DiMaggio & Bowen, P.A.

(57) ABSTRACT

An air deflection device having first and second expandable modules that can also be folded up for storage that include first and second panels for each module and a flexible chamber cover connected to said first and second panels that expand into a 90° pie-shaped cylinder. Each of said modules can be attached to the rear of a truck trailer and expanded into the operating mode forming an air deflection device in the shape of a 180° half cylinder which reduces air drag and eddy currents behind a truck trailer traveling at highway speeds for improving gas mileage. The air deflecting modules may be expanded by inflation using air pumps or manually. Each module includes a series of pie-shaped spacers internally to add rigidity to the shape of each module. The device when deployed can also support an additional load on the top rear of the truck.

4 Claims, 10 Drawing Sheets

TRACTOR TRAILER REAR DOOR AIR DRAG REDUCTION SYSTEM TO REDUCE FUEL CONSUMPTION

BACKGROUND OF THE INVENTION

1. Field of the Invention

This invention relates to a device for altering air flow and air pressure at the rear section of a tractor trailer or truck in order to increase fuel economy.

2. Description of Related Art

In most advanced countries in the world, including the United States and Europe, trucks carry a vast amount of cargo on a daily basis. In recent years the cost of diesel fuel and gasoline for trucks has increased dramatically, increasing the cost of shipping goods by truck. One factor that reduces gas mileage in tractor trailers and other trucks is air flow and air pressure (often referred to as drag) created at the rear end of the trailer or cargo chamber at highway speeds. Typically the cargo storage area of a truck and tractor trailer is a rectangular polyhedron to increase volume. The shape is not aerodynamically efficient for moving at highway speeds through air, resulting in drag, increasing full consumption. The drag increases as a function of velocity squared. The velocity, flow patterns, and pressures of air surrounding and passing by the truck trailer rear vertical surface reduces air flow efficiency resulting in lower gasoline or diesel mileage for the truck. Numerous devices are shown in the prior art to reduce air drag on the rear end section of a tractor trailer and other type truck.

The trailer section of a tractor trailer is typically shaped like a rectangular cargo shipping container. At highway and freeway driving speeds, trucks experience various air flow and pressure patterns including eddy currents generated at the rear surface of the trailer. Devices shown in the prior art have been disclosed to streamline the airflow as the air passes the rear end of the trailer during highway driving especially at top highway speeds. These devices tend to be complex in structure and operation and are costly to install. In different areas of the world tractor trailers and other trucks can carry additional loads at the rear end section of the trailer. The invention described herein is noncomplex in operation and is expandable manually or automatically and is collapsible and foldable for storage.

The invention described in this patent application alters air flow patterns at the rear end section of a trailer during highway driving while also allowing for additional load carrying areas on the top of the air deflection system mounted on the back of the trailer. This is important in some areas of the world where trucks are allowed to carry an extended load at the rear end of the trailer.

SUMMARY OF THE INVENTION

An air flow deflection device for the rear surface of a truck, light truck, or tractor trailer that is secured to the vertical surface, door, or rear doors on the truck. The air deflection device is comprised of a pair of expandable, collapsible and foldable modules forming a semi-cylindrical shape when expanded that are each independently attached to the rear surface of the truck. Each air deflection module operates like a book that can open up to 90° when deployed and close to zero degrees when stored. Each module has a front panel and back panel hinged together along one edge. The front rigid panel opens and closes on the hinge (like a book cover) relative to the back panel that is attached to the truck. A flexible foldable resilient cover is attached to the edges of the front panel and the rear panel so that the cover and front and rear panels form a 90° one quarter of a cylinder in the open position. The cover in each air deflecting module when expanded forms a chamber made of a strong flexible material that can be folded. When the tractor trailer or other truck is parked (especially during loading and unloading), the air deflection device is in a storage position out of use. During road trips, the airflow deflection device is deployed either manually or automatically depending on the embodiment utilized to reduce drag.

In one embodiment the air flow deflection device may be inflated into an operable position by an air pump that fills each flexible module chamber cover with pressurized air. In another embodiment the flexible chamber cover may be enlarged in its operating configuration using a plurality of individual inflatable conduits that are formed as part of the flexible chambers. In yet another embodiment, the flexible chamber cover may be manually deployed with the use of internal spacer members, used inside the flexible chambers for shaping the chamber cover when in use, and cords connected together with various areas of the flexible chamber covers.

The air deflection device in one embodiment employs two individual flexible expandable but foldable chambers. Each chamber when expanded either under air pressure during inflation or manually has an identical shape of one fourth (90 degree) of a cylinder with a curved top surface, a flat bottom surface and a pie-shaped circular exterior surface. Each 90° cylindrically shaped chamber cover is attached to a pair of rigid rectangular panels. The chamber rectangular rigid panels are joined along a single side edge together (along their longer edges) by one or more hinges that allow the rectangular panels to open and close much like a book cover. One panel is attached to the rear surface (door) of the truck. Each one-quarter cylindrical chamber has a flexible chamber with cover that can be folded and a pair of panels constitutes one half of the air deflection device. Each chamber placed side-by-side together form a semicircular one half cylindrical shape device that extends 180° around the back surface of a tractor-trailer or other truck in order to deflect air during transit. The chamber bottom cover surface is flat.

With each module, a single panel is rigidly attached to the rear door of a truck or tractor trailer rear surface with the panel hinges being disposed near the truck door opening on each side. A tractor trailer having a pair of open and closing rear doors has one module attached to each door. Each module front and back panels are hinged together like a book cover and can be opened and closed. When open, the panels and cover form an approximate 90° angle with each other when the module chamber is expanded. Each module panel is made of a rigid material which can be plastic, wood, metal or combination of rigid materials.

Each expandable chamber cover is made of a flexible strong inflatable but foldable material preferably of chlorosulfonated polyethylene (CSPE) synthetic rubber (CSM) sold under the trademark in HYPALON by the DuPont Corporation. Other foldable flexible materials could be used.

The flexible chamber cover used for each air deflection module is constructed similarly. In one embodiment that is inflatable, the material used should be air tight so that air will not pass through the material when the chamber is inflated. Each flexible chamber module cover has a 90° pie shaped top and bottom section sealed and joined to the front and back rigid hinged panels and a cover mid section to form generally a pie-shaped cylinder of 90°. The cover edges are sealed in one embodiment on each side to each rigid rectangular hinged panel. The flexible chamber cover may include additional seams that divide the 90° pie shaped top and bottom segments to allow the segments to fold in and up against itself when the flexible chamber module is in the closed collapsed position, that is when the rigid rectangular panels that are hinged together are closed like a book cover and moved to a parallel relationship hiding the flexible foldable chamber cover inside between the rigid rectangular panels which is the closed non-operable position.

In one embodiment in which the modules inflate, the device uses an air pressure source such as an air pump. A flexible air conduit from the pump is connected through an opening in the flexible chamber cover or panels so that air pressure applied from the pump will cause the flexible chamber cover which should be air tight to inflate forming a pie-shaped one-quarter (90 degree) cylinder. When the system is to be collapsed into the storage position, the air pump flow can be reversed causing suction inside the air deflection chamber of the flexible material causing the flexible chamber to collapse and fold allowing the rigid rectangular panels to be closed in a parallel position.

Because of the rigid rectangular hinged front and back panels, each of which pair opens outwardly at 90° to the back of the truck trailer door, the air deflection device when deployed can support a load placed on top of it from above at the top of the trailer roof extending outwardly. Having two rigid rectangular hinged panels that open and close like a book cover firmly attached to the rear trailer door form a support platform that can carry an additional load on top at the trailer rear while at the same time the air deflecting device has been deployed. Thus the air deflection device can accomplish two separate functions while operating, extended upper load support and air deflection.

In another embodiment, using the same rigid rectangular panels hinged together with a flexible foldable chamber cover to form 90° pie-shaped cylinder, instead of each module being inflated by an air pump or each module having inflatable tubular conduits running through the flexible cover, a series of mechanical devices such as interior rigid foldable pie-shaped spacer members, and cords can be manually deployed inside each flexible chamber module to create the shape of each of the 90° cylinders that are pie-shaped 90°, without the use of an air pump or inflation techniques. In this embodiment the rigid rectangular panels that are hinged together to form the cylinder that is pie-shaped 90° can be manually opened or closed and secured together in the open position manually using control cords and pie-shaped spacer members that give shape to the flexible cover when deployed. The spacer members may be then pie-shaped panels made of plastic, wood or other materials.

It is an object of the invention to provide a device to reduce air drag on a truck, light truck and a tractor-trailer for improving fuel mileage.

It is another object of this invention to provide a device to reduce air drag on a moving truck or tractor trailer that is inexpensive to install and easy to deploy and retract.

PREFERRED EMBODIMENT OF THE INVENTION

Figure 1:
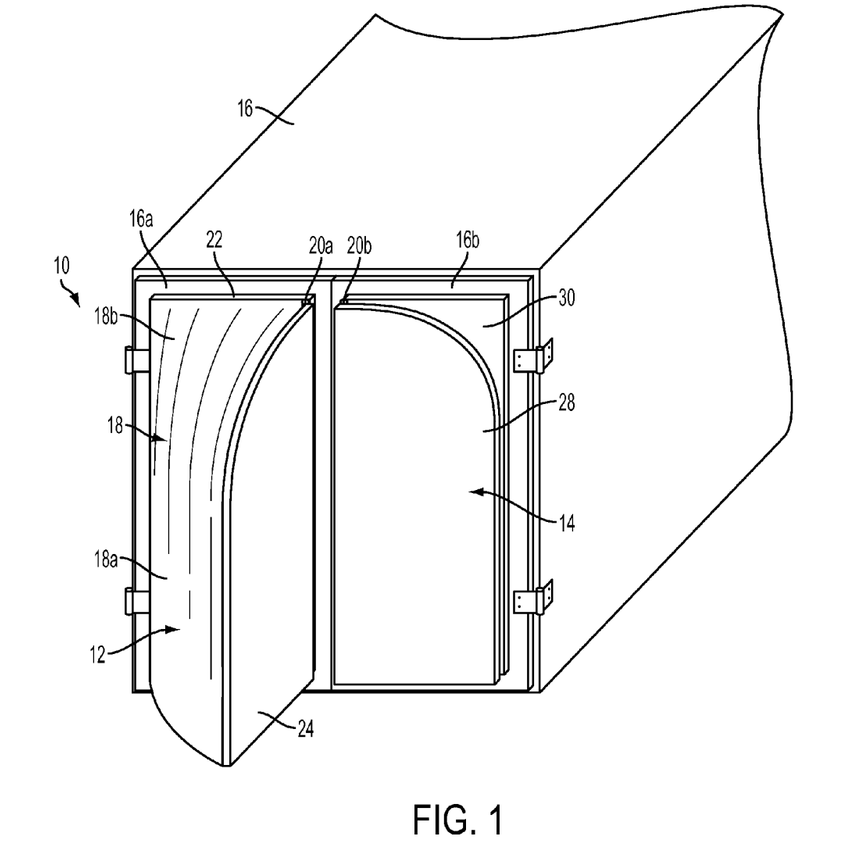
FIG. 1 shows a perspective view of the end of a trailer partially cutaway with one module chamber of the air deflection device fully deployed.

Referring now to the drawings and in particular FIG. 1, an embodiment of the air deflection device 10 is shown attached to the rear end of the trailer 16 comprising a first air deflecting module 12 shown expanded in the operating position and a second air deflecting module 14 in a stored position. In a normal operating situation with the trailer moving down the highway at highway speed, module 14 would also be expanded to reduce drag. The configuration shown in FIG. 1 is for explanation purposes only.

Each module 12 and 14 is partially cylindrical in shape representing a 90° quadrant of a cylinder when expanded. Module 12 includes a rigid curved panel 24 that is attached by a hinge to a similar rectangular panel 22 mounted firmly to the trailer truck door 16a. Module 12 includes a flexible, foldable expandable cylindrically-shaped chamber cover 18 having sections 18a and 18b that form a 90° quadrant or pie-shaped cylinder. Module 14 includes a flexible chamber cover not visible in FIG. 1 that also represents a pie shaped 90° cylinder 14 when expanded. In this embodiment the module 12 has been either manually expanded or inflated by an air pump to give module 12 the cylindrical 90° quadrant configuration. Inside each module chamber are foldable pie shaped spacers (not visible in FIG. 1) to aid in maintaining the shape of the module 12 when expanded. With the invention deployed in this manner, module 12 acts to deflect the low air pressure and eddy currents that cause drag at the end of the trailer 16. It should be noted that in this deployed mode, module 12 can support an extra load on the top of module 12 and on the top of module 14 when expanded allowing for different and extra loading on the trailer.

Figure 2:
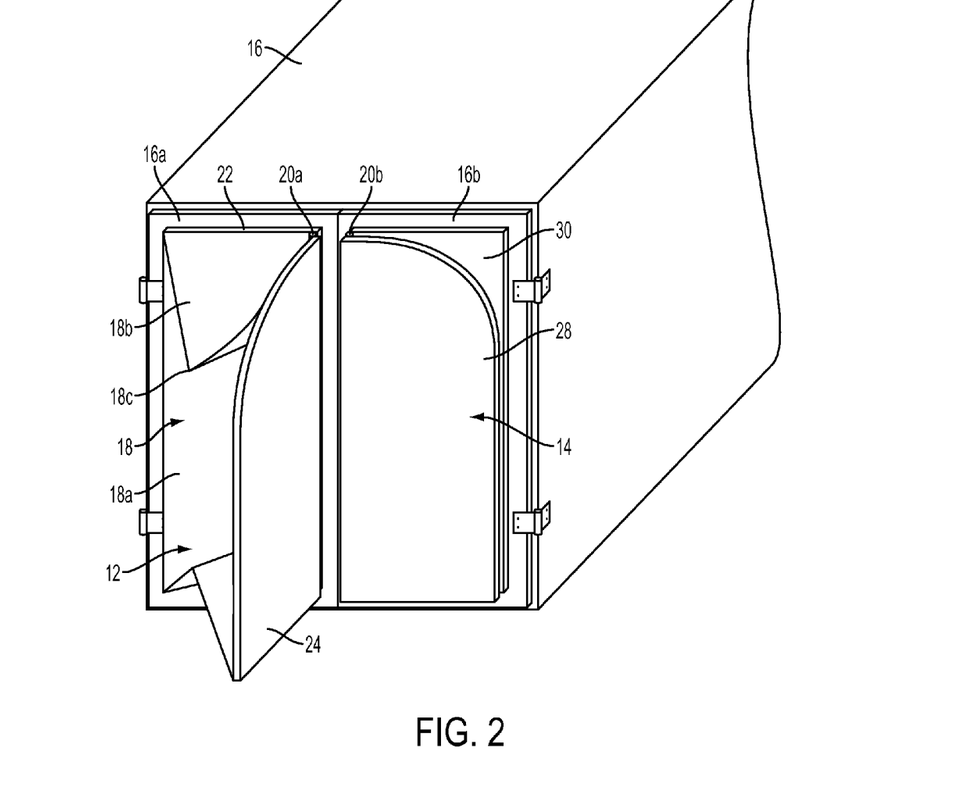
FIG. 2 shows a perspective view of the device shown in FIG. 1 with one air deflection module chamber partially deployed and one air deflection module in the storage position.

Referring now to FIG. 2, module 12 is shown in a partially expanded but partially folded mode while module 14 is shown in a storage mode for explanation purposes. In operation, the invention would not be used in this manner. First, it is noted that module 12 which is a 90° pie shaped cylinder is separately deployable from module 14 and acts independently. Module 12 is comprised of a flexible chamber cover 18 having top section 18b and center section 18a. Cover 18 is firmly attached to a rigid panel 24 that is attached by hinge 20a to a separate rigid rectangular panel 22 which is firmly attached to the trailer door 16a. Module 14 includes a rigid panel 28 which is also attached to another rectangular panel 30 by hinge 20b and is affixed to trailer door 16b. In the closed or storage position as shown in the module 14, the trailer door 16b can be opened or closed in a conventional manner. In this embodiment, the flexible chamber cover 18 forming module 12 and attached to rigid rectangular panel 22 can be manually opened or inflated by air pump 26 for deployment. Note that rigid panel 24 in the extended 90° position from the trailer is capable of supporting weight or a load placed on the roof of trailer 16 extending over the edge for supporting an additional load. The air pump 26 can be located anywhere on the truck and connected by conduits to the modules.

Figure 3:
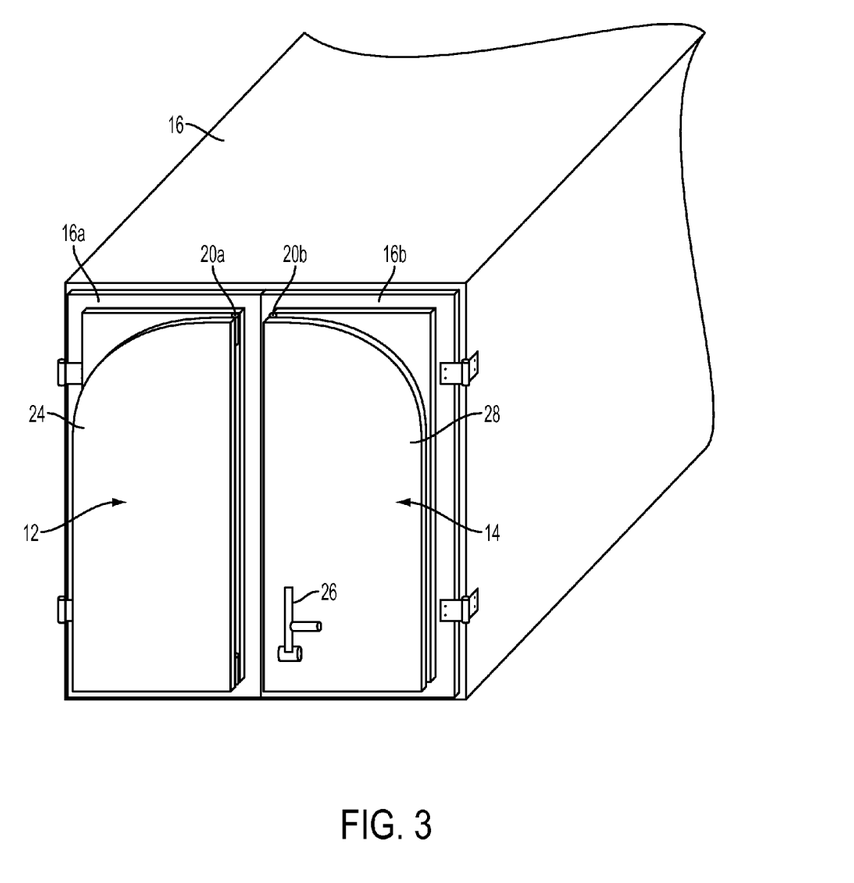
FIG. 3 shows a perspective view of the end of a trailer partially cutaway with the air deflection device embodying the invention in a stored or closed position at the rear end of the trailer.

Referring now to FIG. 3, module 12 and module 14 are both shown in the storage position which would be used when the truck is being loaded or unloaded or when the truck is not being driven. In this mode the trailer doors 16a and 16b can be opened and closed manually in the conventional way so that the trailer 16 can be loaded or unloaded at a loading dock while the air deflection modules 12 and 14 are completely out of the way except for the protrusion of rigid panels 24 and rigid panel 28.

Figure 4:
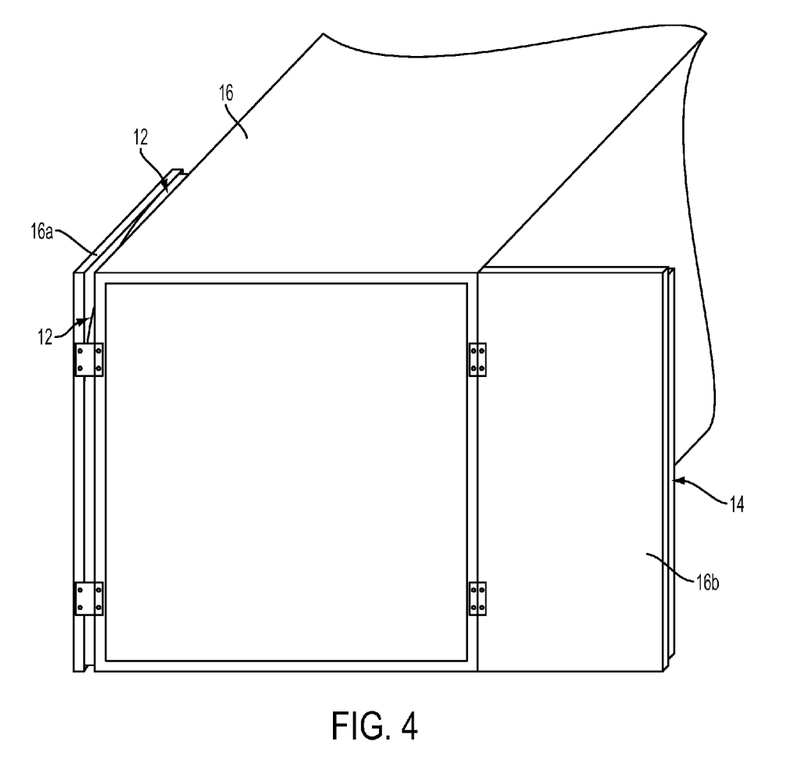
FIG. 4 shows a rear perspective schematic view representing two different trailer door positions, with the air deflection devices in the storage position.

Referring now to FIG. 4, a tractor trailer 16 is shown (as an example) having on one side a door 16a fully open that includes an air deflection module 12 and 14 and the right-hand door 16b half open that has air deflection module 14 attached. The invention can be used with a pair of opening doors or a fully opening door depending on the specific trailer 16 opening.

Figure 5A:
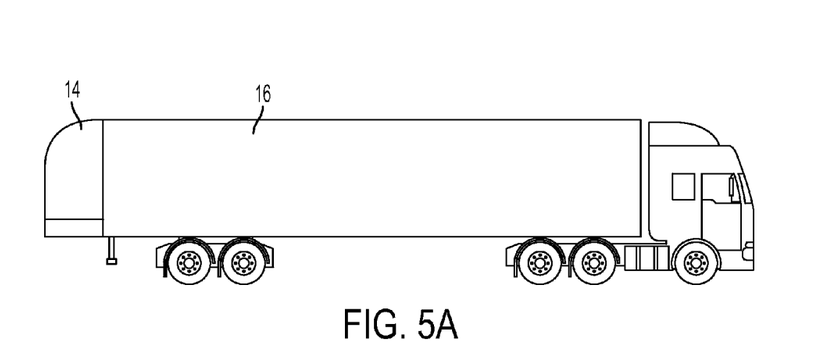
FIGS. 5A, 5B, and 5C show three different views of a tractor trailer with the air deflection device operational including a side elevational view, a top plan view, and a perspective view.
Figure 5B:
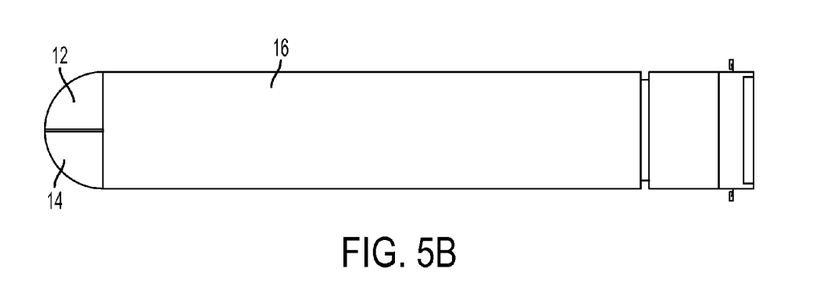
Figure 5C:
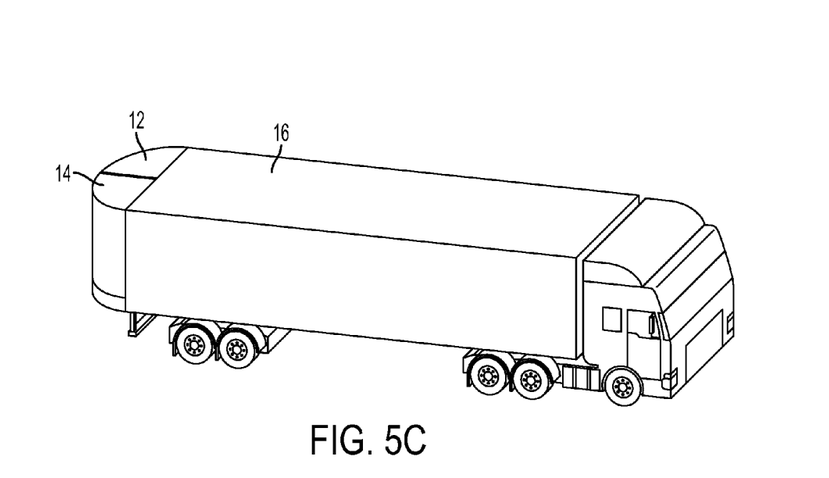

FIGS. 5A, 5B and 5C show the invention in a deployed expanded mode in a side view, a plan view, and a perspective view respectively that includes air deflection modules 12 and 14 extending from the rear of trailer 16 to increase gas mileage in this mode. Also the plan view in FIG. 5B shows how an additional load could be placed on top of modules 12 and 14 extending from the rear the trailer for additional loading in the expanded mode.

Figure 6A:
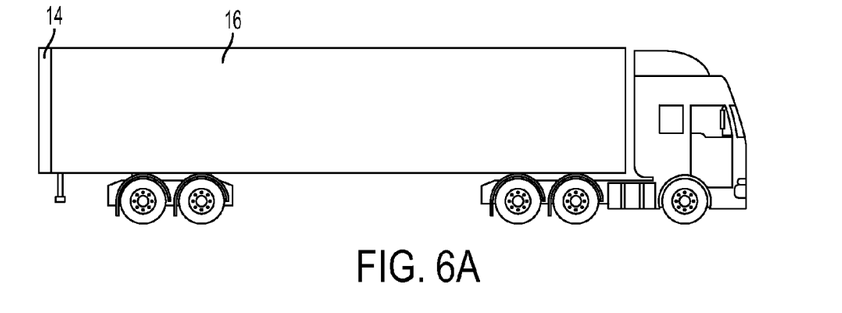
FIGS. 6A, 6B, and 6C show the same views as FIGS. 5A, 5B, and 5C with the air deflection device in the storage position.
Figure 6B:
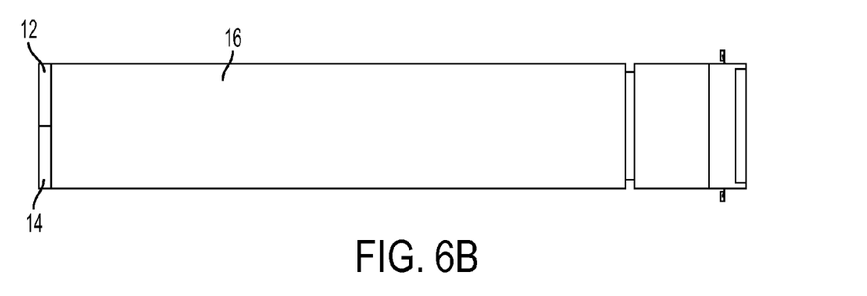
Figure 6C:
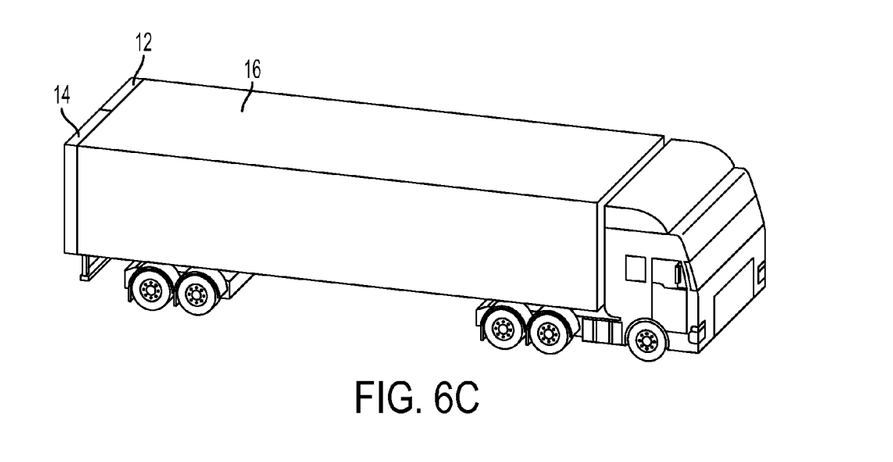

FIGS. 6A, 6B and 6C show the invention in a side elevational view, a top plan view, and a perspective view respectively in which the modules 12 and 14 have been stored so that only the modules 12 and 14 are visible.

Figure 7:
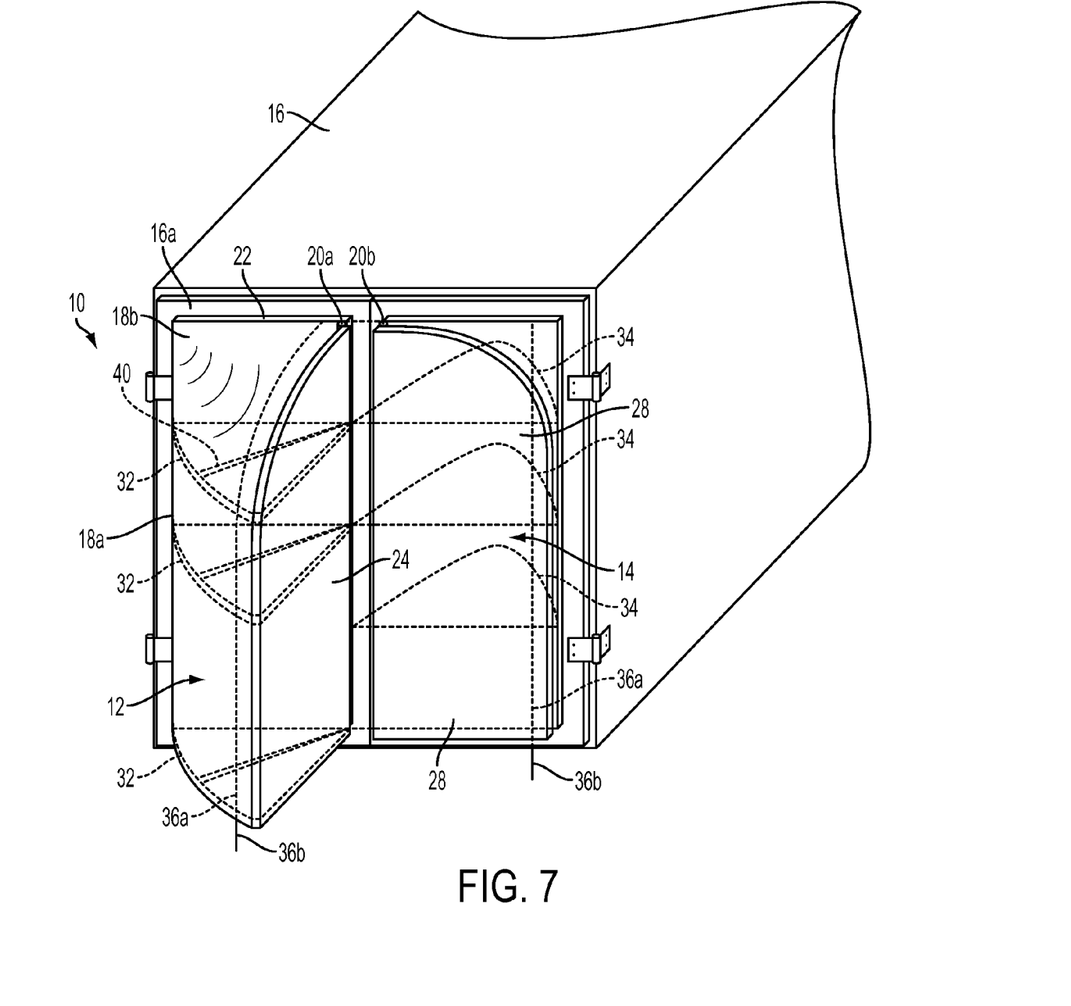
FIG. 7 shows a perspective view in cross section of the end of a trailer partially cutaway with the mechanically supporting pie-shaped spacer members dotted in phantom in the module chamber of the air deflection device.

Referring now to FIG. 7, the air deflection device 10 is again shown attached to the rear end of the trailer 16 comprising a first air deflecting module 12 shown expanded in the operating position and a second air deflecting module 14 in a stored position. Each module 12 and 14 is cylindrical in shape representing a 90° quadrant of a cylinder when expanded. Module 12 includes a rigid curved panel 24 that is attached by a hinge 20a to a rectangular panel 22 mounted firmly to the trailer truck door 16a. Module 12 includes a flexible foldable expandable cylindrically-shaped chamber cover 18 having center section 18a and top section 18b that is a 90° quadrant or pie-shaped cylinder. The foldable pie-shaped spacers 32 inside module 12 are shown fully expanded so as to aid in maintaining the shape of the module 12 when expanded. The foldable pie-shaped spacers 34 inside module 14 are shown vertically dotted in the stored position, whereby the spacers 34 fold together to create a substantially flat profile and allow the module 14 to enter the substantially flat storage position.

Embodiments of the present invention wherein the modules are expanded or collapsed by mechanical action as opposed to air inflation include a rope or cord 36a which runs between and connects cover top section 18b and each pie-shaped spacer 32, 34 and allows them to be expanded or folded in concert. A cord 36b is connected to the panel connector 36a and extends out of the module 12 to provide a location where a user can manually either expand or flatten each module by moving the connector actuator cord 36b in a downward or upward manner relative to the module. In typical configurations, the connector actuator cord 36b is moved downwardly to expand and hold the pie-shaped spacers 32, 34 in an expanded position while the connector actuator cord 36b is moved upwardly and to cause the pie-shaped spacers 32, 34 to fold together, causing each module to adjust to a storage position. It is contemplated that the cord connector is at least foldable so as to allow it to be stored or otherwise oriented when the modules are in the expanded position in a manner so that it does not touch the ground.

Also, it is understood that for air inflatable embodiments of the present invention, each module can be deflated by reversing the flow in an air pump as suction for deflating for the modules to be placed in a storage position.

Figure 8:
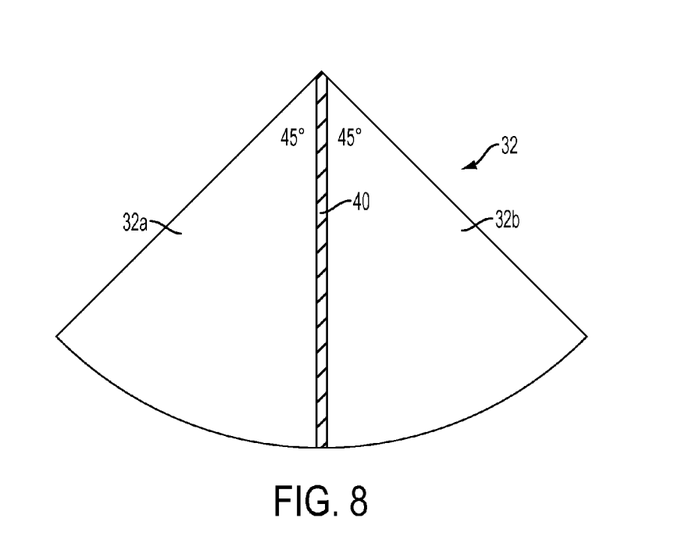
FIG. 8 shows a top plan view of a spacer member used to mechanically support a module chamber built in accordance with the present invention.

Referring now to FIG. 8, the pie-shaped foldable spacer 32 made up of spacers segments 32a and 32b inside module 12 comprise two rigid 45° pie-shaped segments 32 of a circle, joined by a flexible hinge (connector) 40. Using the flexible hinge 40 allows the 45° spacer segments 32 to be expanded in the same plane to give shape to module cover 12 or to be folded onto one another when the module in which the 45° segments 32 reside is sought to be adjusted to a flat storage position.

Figures 9, 10:
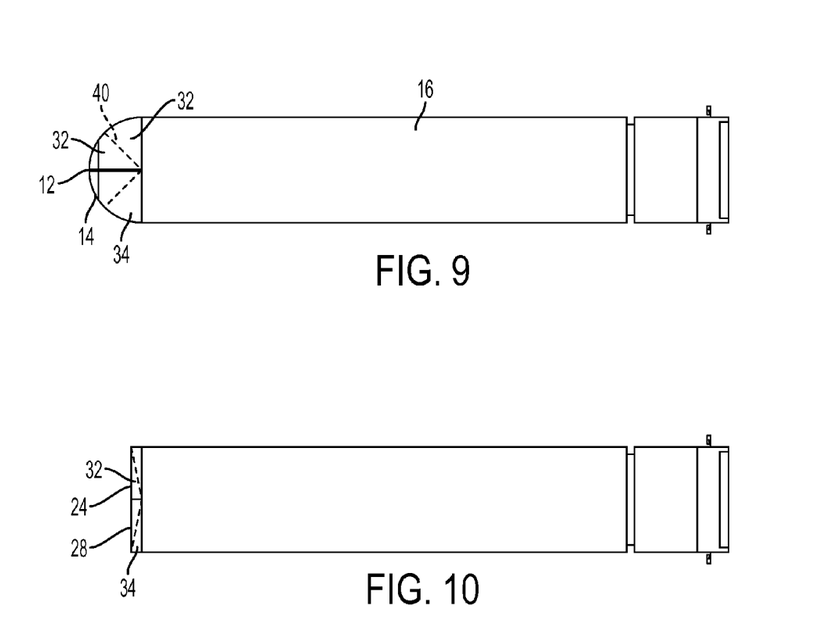
FIG. 9 shows a top plan view in cross section of a tractor trailer with the mechanically supported air deflection device operational.
FIG. 10 shows the same view as FIG. 9 with the mechanically supported air deflection device in the storage position.

Referring now to FIG. 9, the invention is shown in a deployed expanded mode in a top plan view which includes air deflection modules 12 and 14 extending from the rear of trailer 16 to increase gas mileage in this mode. The plan view in FIG. 9 shows both the pie-shaped spacers 32, as well as their discrete 45° segments 34 and flexible portion connector 40 components. FIG. 10 shows the top plan view with the modules 12 and 14 stored so that only the panels 24 and 28 are visible. A cross section of the folded pie-shaped spacer panels 34 is shown dotted in phantom.

Figure 11:
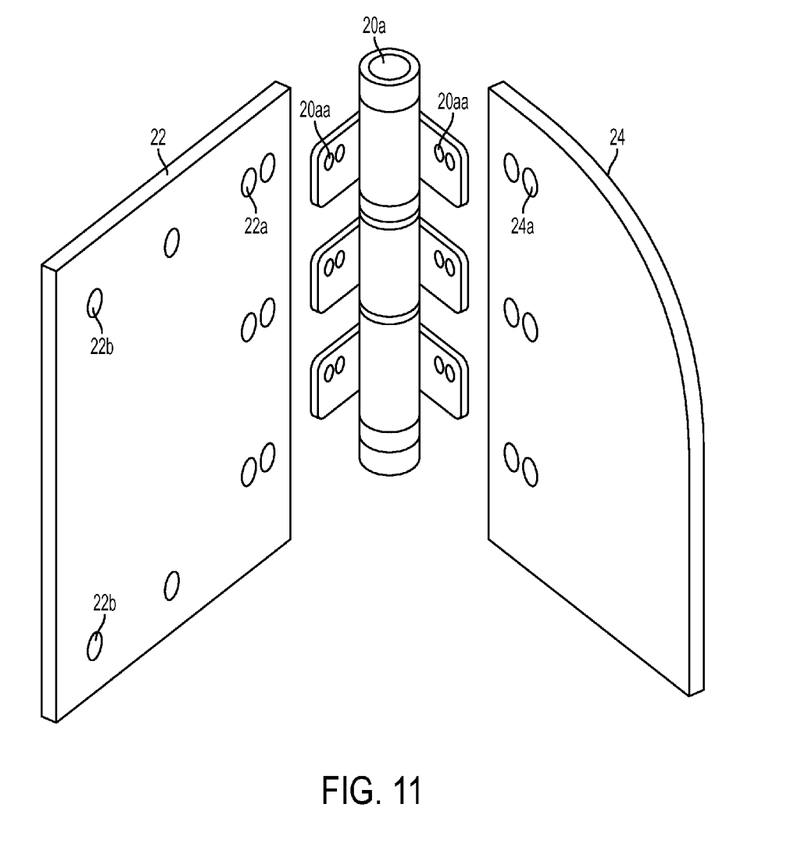
FIG. 11 shows a perspective view of the basic structure of a single air deflection module without the cover.
Figure 12:
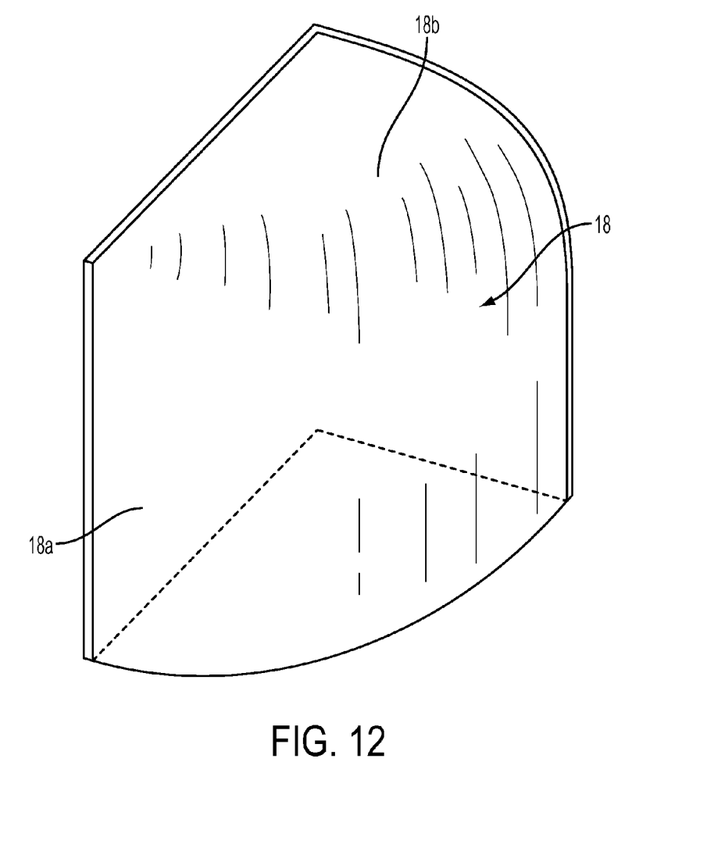
FIG. 12 shows a perspective view of the cover in the open position used with the single air deflection module shown in FIG. 11.

FIGS. 11 and 12 show the invention in its simplest structure. A rectangular panel 22 is connectable to a curved rigid panel 24 by a hinge 20a so that the panels 22 and 24 can open to 90° or close to 0° like a book cover. The hinge 20a has fastener holes 20a for fastening panel 22a fastener hole to hinge 20a and to panel 24 fastener holes 24a. Panel 22 is also firmed attached to the rear door or surface of a truck (not shown) using fastener holes 22b. FIG. 12 shows a flexible foldable cover 18 that when expanded deflects the air flow at the rear of the truck. The cover 18 is attached to panels 22 and 24 shown in FIG. 11 around the panel edges to form an air deflection module.

The invention describe herein shows an air deflection device for a truck that when deployed can reduce fuel consumption and highway speeds and support and additional load.

The instant invention has been shown and described herein in what is considered to be the most practical and preferred embodiments. It is recognized, however, that departures may be made therefrom within the scope of the invention and that obvious modifications will occur to a person skilled in the art.

What I claim is:

1. An air deflection device attachable to the rear door or doors of a truck trailer comprising:
   a first rigid panel;

a second rigid panel;

a hinge connecting said first rigid panel along one edge to said second rigid panel so that said first panel is movable from a parallel position relative to said second panel and to a 90° open position relative to said second panel;

a chamber cover connected to said first panel and said second panel including a top pie-shaped flexible portion and a bottom pie-shaped flexible portion and a 90° curved center exterior portion connected between said first panel and said second panel whereby said chamber cover can be expanded and said first and second panels form a 90° pie shaped cylinder; and said first and second panels movable to a closed position with said cover enclosed therein.

2. A device as in claim 1, including:

an air pump and conduit connected to said chamber cover for inflating and deflating said chamber cover.

3. A device as in claim 1, including:

a foldable 90° pie-shaped spacer, foldable into two 45° pie-shaped segments mounted to the inside top of said chamber cover to provide shape to said flexible chamber body in the extended position.

4. A device as in claim 1, including:

a cord connected to selected portions of said chamber cover for manually expanding or collapsing said chamber cover from an operating position to a storage position.

\* \* \* \* \*